United States Patent [19]
Muntz et al.

[11] Patent Number: 5,799,174
[45] Date of Patent: Aug. 25, 1998

[54] STAGGERED STRIPING IN MULTIMEDIA INFORMATION SYSTEMS

[75] Inventors: Richard Muntz, Pacific Palisades; Steven Berson; Shahram Ghandeharizadeh, both of Los Angeles, all of Calif.

[73] Assignee: The Regents of the University of California, Oakland, Calif.

[21] Appl. No.: 351,608

[22] Filed: Dec. 8, 1994

[51] Int. Cl.$^6$ .................................................. G06T 1/60
[52] U.S. Cl. ................................. 395/508; 395/501
[58] Field of Search ........................ 395/776, 777, 395/501, 506, 507, 508, 806, 807

[56] References Cited

U.S. PATENT DOCUMENTS

| | | | |
|---|---|---|---|
| 5,147,432 | 9/1992 | Gordon et al. | 395/182.05 |
| 5,157,765 | 10/1992 | Birk et al. | 395/508 |
| 5,230,064 | 7/1993 | Kuo et al. | 395/777 |
| 5,241,671 | 8/1993 | Reed et al. | 395/600 |
| 5,357,607 | 10/1994 | Sathi et al. | 395/776 |

*Primary Examiner*—Raymond J. Bayerl
*Assistant Examiner*—Cao H. Nguyen
*Attorney, Agent, or Firm*—Daniel L. Dawes

[57] ABSTRACT

A multimedia object is declustered across a multiple of disk drives to employ the aggregate bandwidth of the several disk drives so that continuous retrieval or display of the object is achieved. The clusters are logically defined across a plurality of disk drives instead of being physically defined so that two consecutive subobjects comprising the data object may be on the same disks. The subobjects are assigned to the disks so that the first fragment of one subobject is k disks apart from the drive that contains the first fragment of the preceding subobject, where k is a fixed stride.

22 Claims, 9 Drawing Sheets

FIG. 4A

|  | \ DISK | 0 | 1 | 2 | 3 | 4 | 5 | 6 | 7 | 8 |
|---|---|---|---|---|---|---|---|---|---|---|
| SUBOBJECT | 0 | X0.0 | X0.1 | X0.2 | | | | | | |
| | 1 | | X1.0 | X1.1 | X1.2 | | | | | |
| | 2 | | | X2.0 | X2.1 | X2.2 | | | | |
| | 3 | | | | X3.0 | X3.1 | X3.2 | | | |
| | 4 | | | | | X4.0 | X4.1 | X4.2 | | |
| | 5 | | | | | | X5.0 | X5.1 | X5.2 | |
| | 6 | | | | | | | X6.0 | X6.1 | X6.2 |
| | 7 | X7.2 | | | | | | | X7.0 | X7.1 |
| | 8 | X8.1 | X8.2 | | | | | | | X8.0 |
| | 9 | X9.0 | X9.1 | X9.2 | | | | | | |
| | 10 | X10.0 | X10.1 | X10.2 | | | | | | |
| | 11 | | X11.0 | X11.1 | X11.2 | | | | | |
| | 12 | | | X12.0 | X12.1 | X12.2 | | | | |
| | 13 | | | | X13.0 | X13.1 | X13.2 | | | |
| | 14 | | | | | X14.0 | X14.1 | X14.2 | | |
| | 15 | | | | | | X15.0 | X15.1 | X15.2 | |
| | ∗∗∗ | | | | | | | | | |

FIG. 4B

DISK

| 0 | 1 | 2 | 3 | 4 | 5 | 6 | 7 | 8 |
|---|---|---|---|---|---|---|---|---|
| X0.0 | X0.1 | X0.2 | X1.2 | X2.2 | X3.2 | X4.2 | X5.2 | X6.2 |
| X7.2 | X1.0 | X1.1 | X2.1 | X3.1 | X4.1 | X5.1 | X6.1 | X7.1 |
| X8.1 | X8.2 | X2.0 | X3.0 | X4.0 | X5.0 | X6.0 | X7.0 | X8.0 |
| X9.0 | X9.1 | X9.2 | X10.2 | X11.2 | X12.2 | X13.2 | X14.2 | X15.2 |
|  | X10.0 | X10.1 | X11.1 | X12.1 | X13.1 | X14.1 | X15.1 |  |
|  |  | X11.0 | X12.0 | X13.0 | X14.0 | X15.0 |  |  |

FIG. 5

| SUBOBJECT \ DISK | 0 | 1 | 2 | 3 | 4 | 5 | 6 | 7 | 8 | 9 | 10 | 11 |
|---|---|---|---|---|---|---|---|---|---|---|---|---|
| 0 | Y0.0 | Y0.1 | Y0.2 | Y0.3 | X0.0 | X0.1 | X0.2 | Z0.0 | Z0.1 | | | |
| 1 | | Y1.0 | Y1.1 | Y1.2 | Y1.3 | X1.0 | X1.1 | X1.2 | Z1.0 | Z1.1 | | |
| 2 | | | Y2.0 | Y2.1 | Y2.2 | Y2.3 | X2.0 | X2.1 | X2.2 | Z2.0 | Z2.1 | |
| 3 | | | | Y3.0 | Y3.1 | Y3.2 | Y3.3 | X3.0 | X3.1 | X3.2 | Z3.0 | Z3.1 |
| 4 | Z4.1 | | | | Y4.0 | Y4.1 | Y4.2 | Y4.3 | X4.0 | X4.1 | X4.2 | Z4.0 |
| 5 | Z5.0 | Z5.1 | | | | Y5.0 | Y5.1 | Y5.2 | Y5.3 | X5.0 | X5.1 | X5.2 |
| 6 | X6.2 | Z6.0 | Z6.1 | | | | Y6.0 | Y6.1 | Y6.2 | Y6.3 | X6.0 | X6.1 |
| 7 | X7.1 | X7.2 | Z7.0 | Z7.1 | | | | Y7.0 | Y7.1 | Y7.2 | Y7.3 | X7.0 |
| 8 | X8.0 | X8.1 | X8.2 | Z8.0 | Z8.1 | | | | Y8.0 | Y8.1 | Y8.2 | Y8.3 |
| 9 | Y9.3 | X9.0 | X9.1 | X9.2 | Z9.0 | Z9.1 | | | | Y9.0 | Y9.1 | Y9.2 |
| 10 | Y10.2 | Y10.3 | X10.0 | X10.1 | X10.2 | Z10.0 | Z10.1 | | | | Y10.0 | Y10.1 |
| 11 | Y11.1 | Y11.2 | Y11.3 | X11.0 | X11.1 | X11.2 | Z11.0 | Z11.1 | | | | Y11.0 |
| 12 *** | Y12.0 | Y12.1 | Y12.2 | Y12.3 | X12.0 | X12.1 | X12.2 | Z12.0 | Z12.1 | | | |

HIGHLY SKEWED (MEAN = 10)

+ SIMPLE STRIPING
* DATA REPLICATION

DISPLAY STATIONS
THROUGHPUT (DISPLAYS/HOUR)

UNIFORM (MEAN = 3.5)

SKEWED (MEAN = 20)

STAGGERED STRIPING IN MULTIMEDIA INFORMATION SYSTEMS

BACKGROUND OF THE INVENTION

1. Field of the Invention

The invention relates to the field of very large data base storage systems and in particular to a system for storing and delivering large amounts of multimedia data.

2. Description of the Prior Art

Multimedia information systems have emerged as a central component of many applications ranging from library information systems to entertainment technology. During the past decade, information technology has evolved to store and retrieve multimedia data, that is data including audio and video components. However, most implementations of these systems cannot support the continuous display of multimedia objects and suffer from frequent disruptions and delays called hiccups. The hiccup is due to the low input/output bandwidth of the currently available disk drive technology, the high bandwidth requirement of multimedia objects, and the large size of these objects that almost always requires them to be disk resident.

A challenging task when implementing these systems is to support a continuous retrieval of an object at a bandwidth or data rate as may be required by the nature of the data of which it is comprised or its media type. The problem is exacerbated when the media type is of a video nature which requires a very high bandwidth. For example, the bandwidth required by the U.S. Video Standard established by the National Television Committee (NTSC) for network quality video is about 45 megabits per second (mbps). Recommendation 601 of the International Radio Consultative Committee calls for a 216 mbps bandwidth for video data. A video object based on high definition television (HDTV) requires an approximately 800 mbps bandwidth. It can be reliably predicted that future demands will require even higher bandwidths than these. To obtain a sense of the magnitude of these bandwidth, one needs to be reminded of the current state of technology, where 40 mbps bandwidth is typical of commercially available magnetic disk drives.

A conventional technique used in the art to support a continuous display of multimedia objects is to sacrifice the quality of data by using a lossy compression technique which reduces the bandwidth required to support a continuous display at the cost of lost data. While this prior art technique is effective, there are applications where data loss cannot be tolerated, such as in medical data or in aeronautics or space applications.

As an alternative, the prior art has also used lossless compression techniques, such as the Huffman, or Lempel Ziv. While a good estimate for the reduction size with these techniques is anywhere from a factor of 2–15, with lossy techniques, size reductions of 10–500 can be obtained. Nevertheless, in any particular application, the range of bandwidth, which may be required from the memory system, may be anywhere from a fraction of the bandwidth of a typical magnetic disk drive, to several times that amount.

Another approach to resolve this limitation is to decluster a multimedia object across multiple disk drives in order to employ the aggregate bandwidth of several disks to support the continuous retrieval and display of the object. Another prior art method for handling very large data bases is virtual data replication. This uses the concept of declustering in a parallel multimedia system based on the shared-nothing architecture as described in Stonebaker, *"The Case for Shared-Nothing,"* Proceedings of Data Engineering *1986*, International Conference on Data Engineering (2nd: Feb. 5–7, 1986 Los Angeles Calif.), IEEE Washington D.C. and was described in the two foregoing Ghandeharizadeh references. This architecture was extended with a tertiary storage device and is described as: (1) a virtual data replication as a system to support multiple users; and (2) three dynamic techniques to manage the physical replicas of the object. Virtual data replication partitions the D disk drives in the system into R=D/M disk clusters, and declusters an object across the disk drives at a single cluster, that is assigns an object to a single cluster. To avoid the cluster that contains the most frequently accessed objects from becoming a bottleneck in the data system, dynamic techniques are introduced to detect and replicate the frequently accessed objects across multiple clusters.

While virtual data replication is a significant first step to provide support for a continuous display, the staggered striping methodology of the invention is a major improvement because it avoids formation of bottlenecks by striping an object across the clusters instead of replicating it. This technique as will be described below enhances the overall performance of the system by enabling a larger number of objects to become disk resident.

BRIEF SUMMARY OF THE INVENTION

The invention is a method for managing a plurality of objects of multimedia information. The method comprises providing a plurality of memories in a hierarchical sequence and logically dividing the plurality of memories into a subplurality of clusters of the memories. Each of the clusters of the memories is accessed concurrently to retrieve a portion of the object defined as a subobject at a rate equivalent to $B_{display}$. Each of the objects is logically divided and each subobject stored in a predetermined number of the memories to define a degree of declustering equal to the predetermined number of memories. Each divided portion of the subobject is defined as a fragment. The fragments are stored in the memories so that a first fragment of a subobject is a predetermined fixed number, k, defined as stride, of memories apart from the memory in which a first fragment of the preceding subobject is stored. As a result, continuous retrieval of the object at a bandwidth required to support display thereof is realized.

The stride is an arbitrary number chosen modulo the total number of memories, D, which comprises the plurality of memories. In one embodiment the objects are of a single media type and the number of memories, D, is a multiple of the degree of declustering, M. The stride, k, is equal to the degree of declustering.

Each of the objects is a different media type having a different corresponding bandwidth and when logically dividing and storing subobjects, each object is independently assigned to selected ones of the memories.

The method further comprises displaying at least one of the objects by concurrently reading the fragments of a single subobject from the memories. A subobject is read during a predetermined time interval. The memories selected in one time interval as compared to a prior time interval are shifted k memories in sequence, where in this embodiment k is generally unequal to the degree of declustering. The fragment assigned to the selected memories is determined by logically dividing the subobject into blocks of data, and assigning the blocks to the memories in a round robin fashion. The blocks of data may be any grouping of data from a single bit to larger groupings such as digital graphic frames or the like depending on the specific application at hand.

In one embodiment logically dividing and storing the subobjects in a cluster of the memories comprises creating fragments within each memory of equal size regardless of media type of the object from which the subobjects are comprised.

The method further comprises providing additional memory for a buffer space, and concurrently reading the blocks of a subobject into the buffer space. The previously buffered blocks are concurrently transmitted for display thus pipelining the delivery from the selected memories to the buffers, and the delivery of data from the buffers to the network.

In one embodiment the subobject of every object has a bit size which is a multiple of the greatest common divisor of the total number of memories, D, and the stride, k, so that data skew is prevented. Alternatively, the total number of memories, D, and the stride, k, are prime numbers so that no data skew occurs.

The method further comprises reading two or more of the objects where the objects have a bandwidth, $B_{display}$, less than the bandwidth of the memories, $B_{disk}$, and the subobjects are read during the same time interval.

Reading the two or more low bandwidth subobjects comprises reading a first subobject during a first portion of a first time interval and concurrently transmitting a first piece of the first subobject using pipelining. A second piece of the first subobject is stored in a memory buffer for transmission during a second portion of the first time interval. A second subobject is read during the second portion of the first time interval and a first piece of the second subobject and the second piece of the first subobject is concurrently transmitted by pipelining. The second piece of the second subobject is stored in a memory buffer for transmission during a first portion of a subsequent second time interval. The steps of reading a first subobject, storing a second piece of the first subobject, reading a second subobject and storing the second piece of the second subobject are repeated until the objects are completely transmitted.

The method further comprises the steps of logically dividing each of the memories into a plurality of logical submemories having reduced bandwidth of the memory wherein the object has a bandwidth, $B_{display}$, equal to an integral number of the logically divided memories of the reduced bandwidth so that expanded bandwidth objects may be exactly accommodated without loss due to rounding up the number of the memories.

The method further comprises storing an object X from a tertiary storage device into the plurality of memories by organizing fragments of the object in the tertiary storage device based upon distribution of the fragments across the plurality of memories. A predetermined plurality of fragments of the subobject is stored into a corresponding plurality of the memories during a first time interval. A second sequential set of fragments of the objects is stored in the plurality of memories k memories further advanced in sequence. As a result there is no delay caused by overhead downtime of the tertiary store device because of nonsequential readout from the tertiary storage device.

The method further comprising fast forwarding through the plurality of memories with scanning of the object by reading a fast forward replica object corresponding to the requested object. The fast forward replica object having a bit size which is a small fraction of the bit size of a subobject corresponding to the requested object.

The invention is also characterized as an apparatus for display of objects in a multimedia information system comprising a plurality of display stations and a centralized scheduler coupled to and bidirectionally communicating with each of the display stations. A tertiary storage device is coupled to and communicates with the centralized scheduler. A plurality of memories is coupled to and bidirectionally communicates with the centralized scheduler and tertiary storage. The centralized scheduler includes an object manager, a disk manager, and a tertiary manager. The object manager maintains the availability of objects on the plurality of memories. The disk manager keeps track of the memories within the plurality during each time interval. The tertiary manager maintains a queue of requests waiting to be serviced by the tertiary storage device. The objects are stored in the plurality of memories by staggered striping of the memories. As a result, continuous retrieval of the object at a bandwidth required to support its display within the display stations is provided.

The invention may better visualized by turning to the following drawings.

BRIEF DESCRIPTION OF THE DRAWINGS

FIG. 4a is the logical disk layout for staggered striping of the invention in an example using eight disks.

FIG. 4b is the physical disk layout corresponding to FIG. 4a.

FIG. 5 is the logical disk layout for staggered striping of the invention in an example using 12 disks.

The invention and its various embodiments may now be understood by turning to the following detailed description.

DETAILED DESCRIPTION OF THE PREFERRED EMBODIMENTS

In the Brief Summary above the memories are described generically as modules and may include any type of memory now known or later devised, such as tape memories, optical memories, compact disk memories, disk memories, holographic memories and the like. In the illustrated embodiment below, the invention will be described in terms of disk memories, but it must be understood that any device or system for storing data could be equivalently substituted.

A multimedia object is declustered across a multiple of disk drives to employ the aggregate bandwidth of the several disk drives so that continuous retrieval or display of the object is achieved. The clusters are logically defined across a plurality of disk drives instead of being physically defined so that two consecutive subobjects comprising the data object may be on the same disks. The subobjects are assigned to the disks so that the first fragment of one subobject is k disks apart from the drive that contains the first fragment of the preceding subobject, where k is a fixed stride.

In the initial portion of the specification below, for the ease of understanding, assume that each data object has a constant bandwidth requirement. Assume the display stations have a limited amount of memory. This means the data has to be produced at approximately the same rate as its consumption rate at the display station. Assume the network delivers the data to its destination both reliably and is always fast enough, and therefore is eliminated as a consideration, at least in the initial portion of this specification. Finally, assume the bandwidth requirements of the displayed objects exceed the bandwidth of both the tertiary storage device and a single disk drive.

Figure 1:
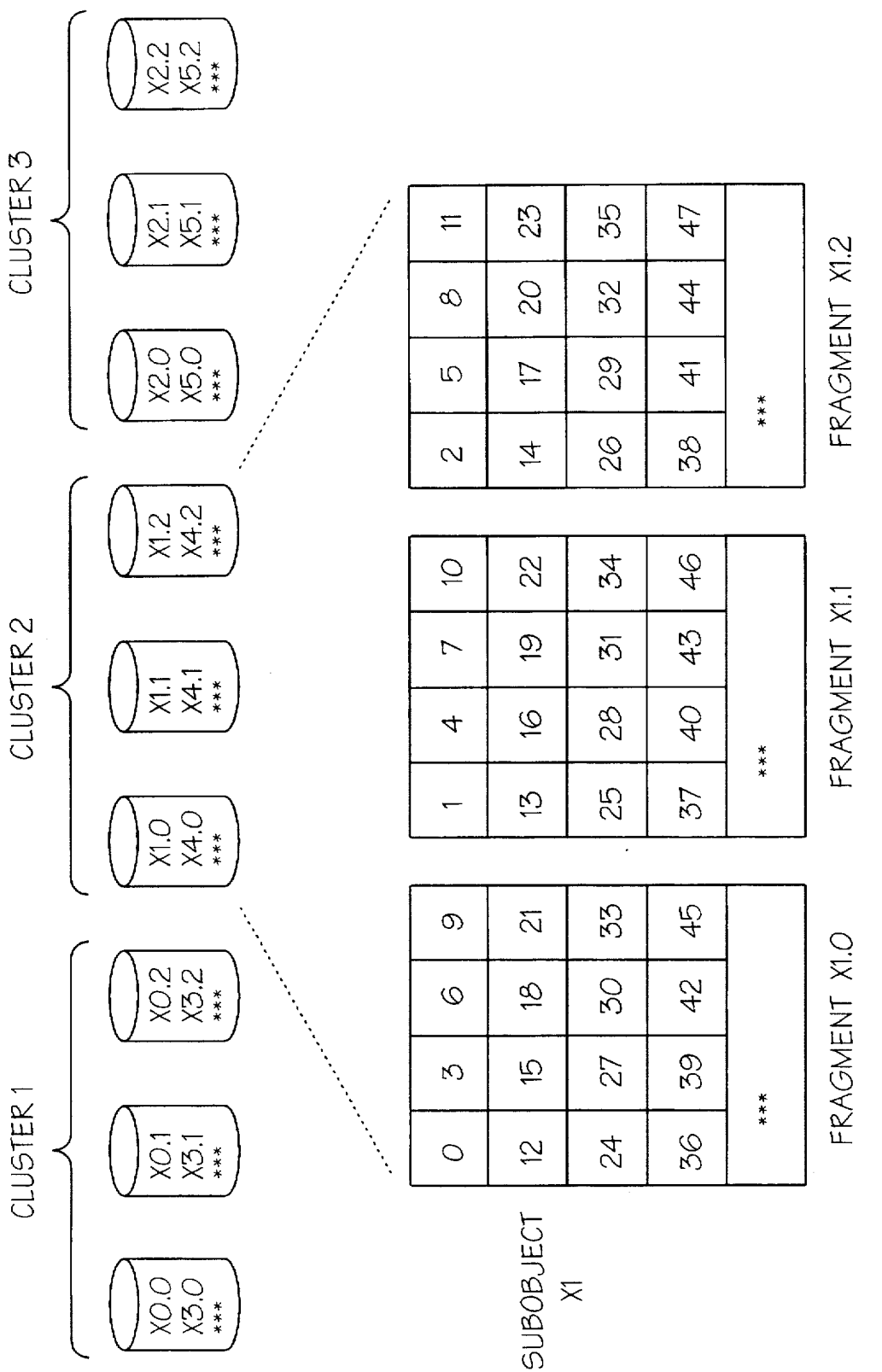
FIG. 1 is a diagrammatic depiction of the plurality of disk drives which have been clustered and into which a fragment layout according to simple prior art striping technique.
Figure 3:
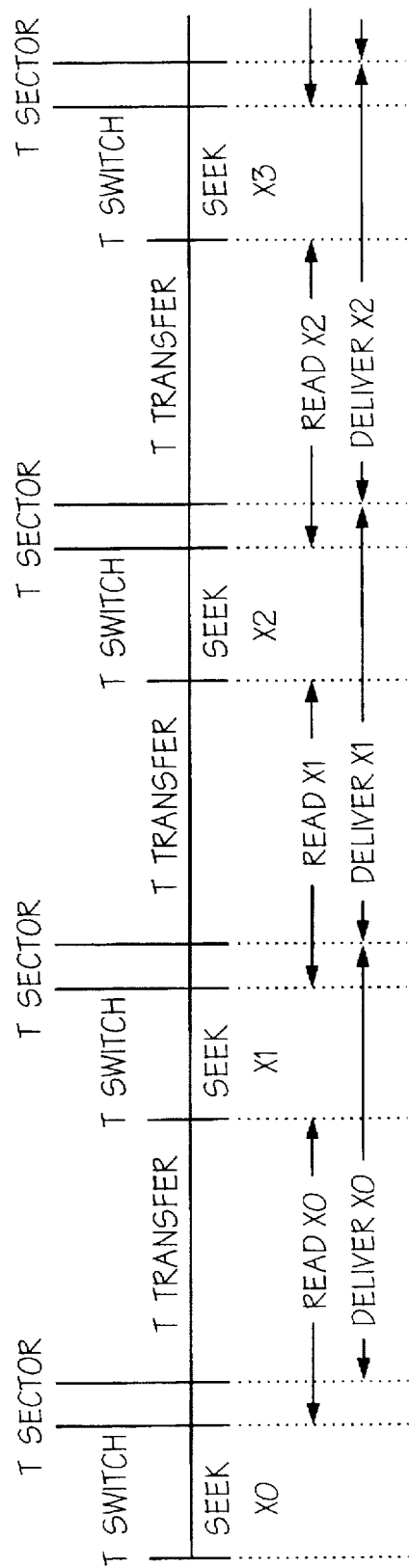
FIG. 3 is a time line showing how a continuous display is provided using the system of FIG. 1.

To better understand the advantages of staggered striping, consider first further a simple striping system in which each of the above assumptions are satisfied. The object will be striped according to the simple striping technique as shown in FIG. 1. When the request service displays X, it employs a single cluster at each time interval. However, when the system switches from one cluster, such as cluster $C_0$, to another, such as cluster $C_1$, the disk drives that constitute $C_1$ incur the seek and latency times associated with repositioning their heads to the location containing the referenced fragments. To eliminate hiccups that might be attributed to this factor, simple striping computes the worst case delay, defined at $T_{switch}$ for $C_1$ to reposition its heads and, relative to the consumption rate of the display station, produces the data such that the station is busy displaying $T_{switch}$ worth of data when the switch takes place as diagrammatically illustrated in FIG. 3. FIG. 3 is a time line which shows a continuous data transfer from the disk clusters using a small cache or buffer memory.

Striping and declustering techniques can be employed in both general purpose multidisk input/output subsystems and parallel database management subsystems. Assume for the sake of simplicity that a hierarchical storage architecture is comprised of a tertiary storage device accessible to a group of disk drives. Assume that the stations used to display the objects are independent both of the tertiary storage device and the disk drives on which the object is stored. The database resides permanently on the tertiary storage device and its objects are materialized on the disk drives on demand and deleted from the disk drives when the disk storage capacity is exhausted.

Focus in particular on an input/output bottleneck phenomena. For the sake of ease of understanding, assume the bandwidth of both the network and the network device driver exceeds the bandwidth requirement of any object. In other words, the hardware is faster than the rate at which the data needs to be delivered. Assume also a fixed bandwidth, $B_{disk}$, for each disk in the system and a database comprised of objects that belong to a single media type with bandwidth requirement, $B_{display}$. The aggregate bandwidth of at least M disk drives are to be used to provide a continuous display of the object, where $M=B_{display}/B_{disk}$.

The continuous display is achieved by simple striping. First, the D disk drives in the system are organized into R disk clusters, where R=D/M. Next, each object in the database, X, is organized as a sequence of n equally sized subobjects, $X_0, X_1, \ldots, X_n$. Each subobject $X_i$ represents a contiguous portion of the object X. When X is materialized or read from the tertiary storage device, its subobjects are assigned to the clusters in a round-robin manner, starting with an available cluster. In a cluster, a subobject is declustered into M pieces or fragments, with each fragment assigned to a different disk drive in the same cluster.

When the system displays the object X, it starts by using the cluster that contains the first subobject, $X_0$, which may be for example the cluster $C_i$, in order to display the first portion of the object X. Next, the system employs $C_{i+1 \mod R}$ to display the next subobject, $X_1$. The system iterates over each of the clusters until the entire object X is displayed, while employing a single cluster at any one given point in time.

A specific illustration will make this clear. Assume that object X requires a 60 mbps bandwidth to support its continuous display, i.e. $B_{display}(X)=60$ mbps. Moreover, assume that the system is comprised of nine disk drives, each having a bandwidth of 20 mbps, i.e. $B_{disk}=20$ mbps. Thus, the aggregate bandwidth of M=60/20=3 disk drives are needed to support a continuous display of the object X. FIG. 1 illustrates how a simple striping technique organizes the subobjects of X. In FIG. 1, the nine disk drives are partitioned into three clusters, D/M, each of which consist of M=3 disk drives. Each subobject of X, e.g. $X_1$, is declustered into three fragments denoted as $X_{1,0}, X_{1,1}, X_{1,2}$. The fragments in turn are broken down into blocks. A request to retrieve object X results in the system employing cluster 0 to display $X_0$. Subsequently, cluster 1 is employed to display $X_1$, and so forth. Therefore, the display of X employs only a single cluster at each time interval, enabling the system to support three simultaneous displays.

The fragments of a subobject, e.g. $X_1$, are constructed using a round-robin assignment of the blocks of $X_1$ to each disk drive as shown in FIG. 1, allowing the system to overlap the display of $X_1$ with its retrieval from the disk drives using the multi-input pipelining technique as described by Ghandeharizadeh et al., "*Object Placement in Parallel Hypermedia System,*" Proceedings of VLDB 1991; and Ghandeharizadeh et al., "*Management of Physical Replicas in Parallel Multimedia Information System,*" Proceedings of the 1993 Foundations of Data Organization Algorithms Conference, October 1993, which are expressly incorporated herein by reference. This technique minimizes the amount of memory required for buffering the data. However, in practice, some memory is needed per disk drive to eliminate hiccups or data delays that may arise due to disk seeks which occur when the system switches from one cluster to another, as described in greater detail below.

Assume some memory is allocated for each disk drive. In a disk memory the storage is provided on a plurality of cylinders, each of which are subdivided into a plurality of tracks, which in turn are divided into a plurality of sectors. Upon activation of the disk drives in a cluster, each disk drive performs the following steps:

1. each disk repositions its head, taking the time between 0 to $T_{switch}$ seconds to do so;
2. each disk starts reading its fragment, taking the time $T_{sector}$ seconds to read each sector;
3. when all the disks have read at least one sector, the synchronized transmitting of data to the display stations is begun; and
4. the disks continue reading of the complete fragment overlapped with transmission to the display station.

$T_{switch}$ represents the maximum duration of the first step. $T_{sector}$ is the time required to read a sector into memory. The minimum amount of required memory for this operation is a function of these two times and is:

$$\text{memory size} = B_{disk} \times (T_{switch} + T_{sector})$$

Simple striping divides the time into fixed length intervals. A time interval is the time required for a disk drive to perform the four steps described above and constitutes the service time of a cluster, denoted as $S(C_i)$. The duration of a time interval is dependant upon the physical characteristics of the storage device, that is its seek and latency times and transfer rate as well as the size of the fragments.

To illustrate, recall the physical layout of an object X shown in a cluster of disks in FIG. 1. Once a request references object X, the systems reads and displays $X_0$ using cluster $C_0$ during the first time interval. The display of the object starts at step 3 above of this time interval, i.e. after all disks have at least one sector read. During the second time interval, the system reads and displays $X_1$ using cluster $C_1$. The display time of the cached data eclipses the seek and latency time incurred by $C_1$ in step 1, providing for a continuous retrieval of X as diagrammatically depicted in time line of FIG. 3. This process is repeated until all the subobjects of X are displayed.

Figure 2:
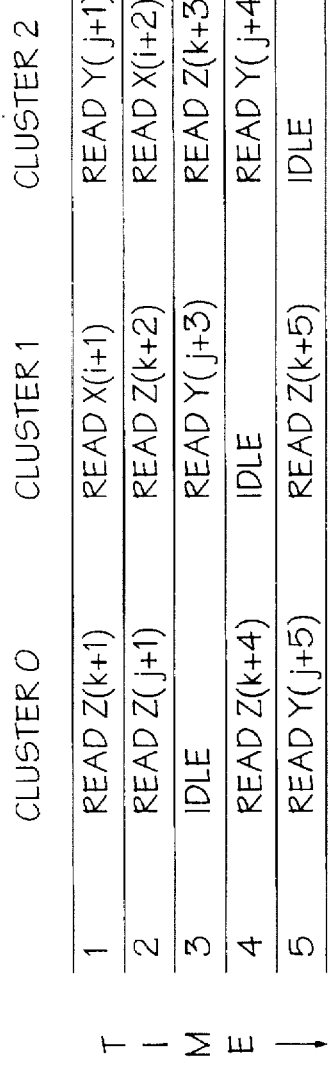
FIG. 2 is a table showing an example of the operation of the system of FIG. 1 according to simple striping when objects of different size are accessed.

FIG. 2 illustrates this object delivery scheme for three requests referencing three different disk resident objects, denoted as X, Y and Z. Each object is divided into a plurality of subobjects $X_i$, $Y_j$, and $Z_k$, where the integer indices i, j, and k are arbitrary in magnitude and independent of each other. FIG. 2 demonstrates the scheduling of clusters at the midpoint of the retrieval. Subobject $X_{i+2}$ is the last subobject of X. Thus, disk cluster $C_0$ is not used to read a subobject during both time intervals 3 and 6, while disk clusters $C_1$ and $C_2$ are not used to read subobjects during time intervals 4 and 5, respectively. If a request were to arrive before time interval 3, referencing an object whose first subobject resides on cluster $C_0$, then these idle time intervals would be used to service the new request.

The fragment size is a parameter that must be decided at the time the system is configured. The larger the fragment size, the greater the effective disk bandwidth needed. This is because after the initial delay, $T_{switch}$, overhead to position the read heads, there is little additional overhead no matter how much data is read. More formally, if tfr is the transfer rate of a single disk and $f_{size}$ is the size of a fragment, then the effective disk bandwidth, $B_{disk}$, is:

$$B_{disk} = \text{tfr} \times f_{size} / [f_{size} + (T_{switch} \times \text{tfr})]$$

There is also a tradeoff between the effective disk bandwidth and the time to initiate the display of an object. At the instant of arrival of a new request referencing an object X, the cluster containing the subobject $X_O$ might be busy servicing another request while the other clusters are idle. In this case, the request has to wait until the cluster holding $X_0$ becomes available. For example, if a system is comprised of R disk clusters and is almost completely utilized servicing R−1 requests, then in the worst case, the latency time for a new request is $(R-1)*S(C_i)$. In summary, as one increases the size of a fragment, the display latency time increases, while the effective disk bandwidth increases.

To illustrate, a typical 1.2 gigabyte disk drive is comprised of 1,635 cylinders, each with a capacity of 756,000. The disk has a peak transfer rate of 24.19 mbps. Its minimum, average, and maximum disk seek times are 4, 15, and 35 milliseconds, respectively. Its average and maximum disk latency times are 8.33 and 16.83 milliseconds, respectively. Typically, a cylinder can be read with an overhead of one seek and one latency time. Thus, the time to read one cylinder is 250 milliseconds, while the highest overhead due to seek times and latencies is 16.83+35=51.83 milliseconds. If the size of a subobject is chosen such that each of its fragments are one cylinder in size, then $S(C_i)$ is equal to 301.83 milliseconds. Thus, on the average, 17.2 percent of the disk bandwidth is wasted due to seek and latency times. If two consecutive cylinders are transferred, $S(C_i)$ equal 555.83 milliseconds and the wasted bandwidth decreases to 10 percent. In a typical system of 90 disks divided into 30 clusters of 3 disks each, the worst case transfer initiation delay will be about 9 seconds in the case of one cylinder transfers and 16 seconds in the case of two cylinder transfers.

Without loss of generality, and in order to simplify the description, assume that the size of the fragment for each object X is two cylinders. This is a reasonable assumption because: (1) it wastes only about 10 percent of the disk bandwidth; and (2) the advantages of transferring more than two cylinders from each disk drive is marginal because of diminishing gains in effective disk bandwidth beyond two cylinders.

When the database is comprised of a mix of media types each having a different bandwidth requirement, the design of simple striping can be extended to minimize the percentage of wasted disk bandwidth. For example, assume that the database is comprised of two video objects, Y and Z. The bandwidth requirement of Y is 120 mbps and that of Z is 60 mbps. A naive approach to support these objects might be to construct the disk clusters based on the media type that has the highest bandwidth requirement, resulting in six disks per cluster, using the assumption that $B_{disk}$ is equal to 20 mbps. This would cause the system to employ a fraction of disks in a cluster when servicing a request that references object Z, thereby sacrificing 50 percent of the available disk bandwidth. The staggered striping of the invention is a superior alternative in that it minimizes the percentage of disk bandwidth that is wasted.

Staggered Striping

The staggered striping of the invention is a striping methodology that constructs the disk clusters logically instead of physically and removes the constraint that the assignment of two consecutive subobjects of X, for example $X_i$ and $X_{i+1}$, be on non-overlapping disks. Instead, staggered striping assigns a subobject to the disks such that the disk containing the first fragment of $X_{i+1}$, i.e. $X_{i+1,0}$ is k disks, modulo the total number of disks, apart from the disk drive that contains the first fragment of $X_i$, i.e. $X_{i,0}$. The distance between $X_{i,0}$ and $X_{i+1,0}$ is termed stride. Stride is thus defined as the distance as measured in the number of disk drives between the first fragment of a subobject $X_i$ and the first fragment of the next subobject $X_{i+1}$. If the database is comprised of a single media type with a degree of declustering $M_x$ and D is a multiple of $M_x$, then staggered striping can implement simple striping by setting the stride equal to the degree of declustering of the object, that is $k=M_x$. The degree of declustering, $M_x$, is defined as the number of disks drives that a subobject is declustered across, namely $M_x = B_{display}(X)/B_{disk}$. Therefore, the term, "staggered striping" will be used in the claims below as generally described in the specification.

FIGS. 4a and b illustrate both logical and physical assignments respectively of subobjects of X with staggered striping with a stride of k=1. As compared with simple striping, the display of an object X with staggered striping differs in the following way: after each time interval, the disks employed by a request shift k to the right instead of $M_x$ as would be the case with simple striping.

When the database is comprised of a mix of media types, the objects of each media type are assigned to the disk drives independently, but all with the same stride. FIG. 5 illustrates the assignment of objects Z, X and Y with a bandwidth requirement of 40, 60 and 80 mbps, respectively, so that the degree of declustering is $M_z=2$, $M_x=3$ and $M_y=4$. Assume that the stride of each object is 1. In order to display object X, the system locates the $M_x$ logically adjacent disk drives that contain its first subobject, namely disks 4, 5 and 6. If these disk drives are idle, they are employed during the first time interval to retrieve and display the subobject $X_0$. During the second time interval, the next $M_x$ disk drives are employed by shifting k disks to the right.

With staggered striping it is easy to accommodate objects of different display bandwidths with little loss of disk to the bandwidth. The degree of declustering of objects varies depending upon the media type. However, the size of the fragment, which is defined as a unit of data transferred from a single disk drive and which is constructed by declustering a subobject, $X_i$, across $M_x$ disk drives, is the same for all objects, regardless of their media type. Consequently, the duration of a time interval is constant for all multimedia objects. For example in FIG. 5, the size of subobject $Y_i$ is twice that of subobject $Z_i$, because Y requires twice the bandwidth of object Z. However, their fragment size is identical because $Y_i$ is declustered across twice as many disks as $Z_i$.

When displaying an object, staggered striping uses the ideal number of disk drives per display during each time interval and thereby does not waste the bandwidth of the disks which are employed. However, staggered striping may cause a fraction of the disk drives to remain idle even though there are requests waiting to be serviced. This occurs when the idle disk drives are not adjacent due to the display of other objects. This limitation is defined as bandwidth fragmentation. For example, consider the assignment of objects X, Y and Z in FIG. 5. Assume that an additional object, W, with the same bandwidth requirement as object Y, is disk resident, and has a degree of declustering, MW=4. Suppose the placement of W0 starts with disk 4, W0.0 is stored in the same disk drive containing X0.0. If the system is busy servicing three displays referencing the objects X, Y and Z, then there are three disk drives that are idle. Assume that a new request arrives referencing object W. The new request would have to wait because the number of idle disks, three, is less than the number of disk drives that the object requires, namely four. If the display of object X is completed, then there would be a total of six disks available. However, the system is still unable to display object W because the available disk drives are not adjacent to each other. They are in groups of three, separated by the display of Y and Z. The system cannot service displays requiring more than three disks until display of either Y or Z is completed.

Therefore, it can be appreciated that the allocation of disk resource to satisfy request is now subject to fragmentation problems similar to those of dynamic memory allocation. Bandwidth fragmentation can be alleviated by careful scheduling of jobs, but cannot be completely eliminated by scheduling alone. However, with additional memory for buffer space and additional network capacity, the bandwidth fragmentation problem can be solved. To accomplish this, assume that a fragment can be read from a disk into a buffer in one time interval and, in a subsequent time interval, the same processor node can concurrently transmit to the network both: (a) the previously buffered fragment; and (b) a disk resident fragment using the pipelining scheme referenced by incorporation earlier. The buffers can be used to utilize a set of disks that are not adjacent to deliver an object. The bandwidth fragmented disks are later dynamically coalesced as intervening busy disks become available.

Figure 6:
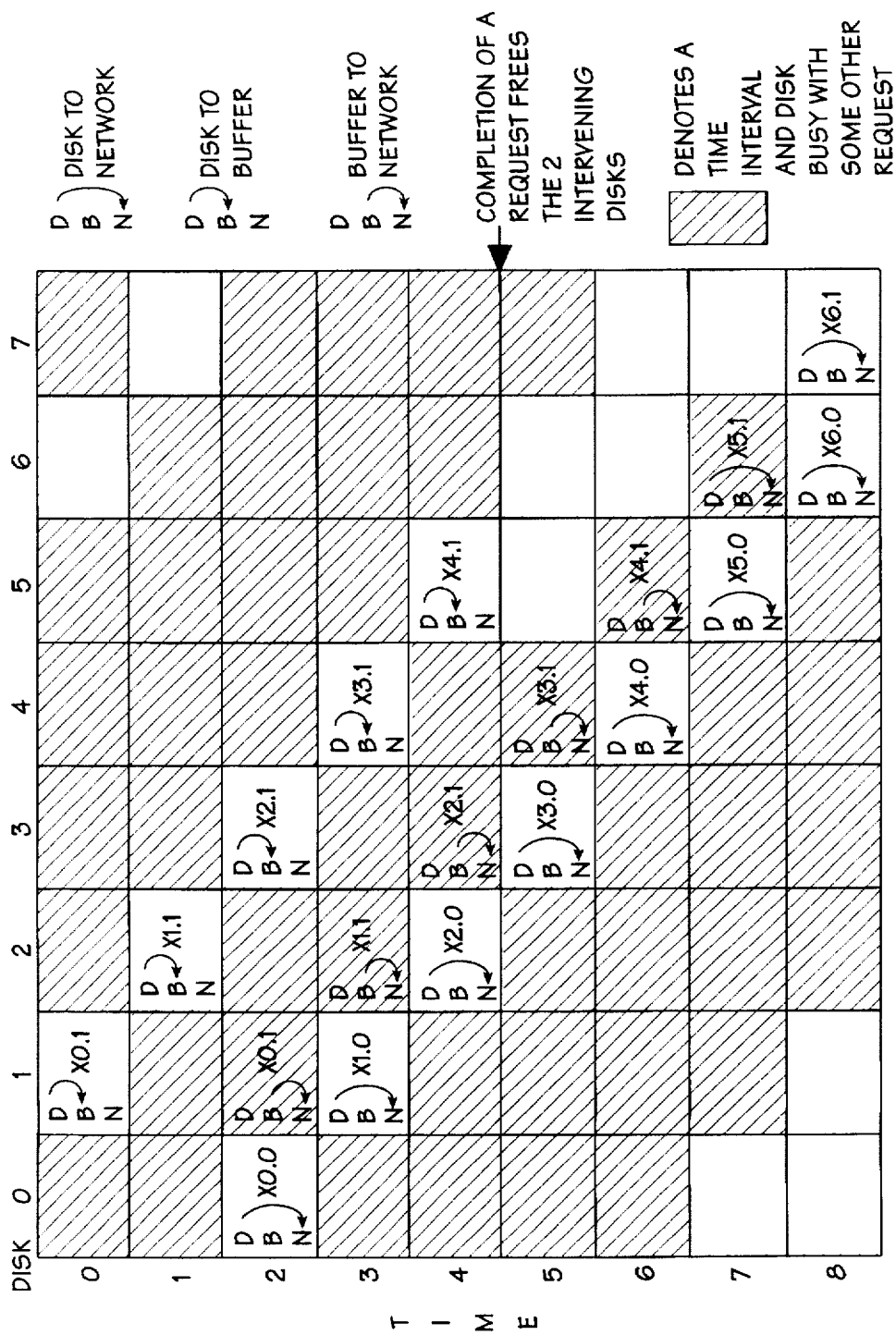
FIG. 6 illustrates how a buffer memory is used in a staggered striping system to optimize the performance of bandwidth fragmented disks.

FIG. 6 shows an example of how the approach works. In FIG. 6, the white regions indicate which disks are available for servicing new requests while the shaded regions are disks busy servicing other requests. Assume that a request arrives at time interval 0 for an object X with a degree of declustering equal to 2. Further assume that the stride is 1 and the initial subobject X0 is stored on disks 0 and 1. There are two free disks, but they are not consecutive and there are two intervening busy disks. Disk 1 is free and is in position to read fragment X0.1, however disk 6 which is also free does not contain X0.0 and cannot read this fragment to support display of the subobject, X0. In order to support bandwidth fragmented delivery of object X, disk 1 can keep fragment X0.1 in memory until time interval 2 when it can be delivered along with fragment X0.0. Thus, at time interval 2, fragment X0.0 is pipelined direct from disk 0 to the network, while node 1 transmits fragment X0.1 from its buffer, while disk 1 is concurrently servicing another request. Similarly, disk 2 reads fragment X1.1 at time interval 1, and buffers it until time interval 3 when both X1.0 and X1.1 can be delivered.

FIG. 6 also illustrates how bandwidth fragmented requests can be dynamically coalesced. Suppose at time interval 5, the two intervening disks have completed their service and have become free. At that point, the bandwidth fragmented request can be completely coalesced so that the disk supporting the transmission of object X are adjacent. Depending on how many disks become free, a bandwidth fragmented request may only be partially coalesced. By the start of time interval 5, fragments X3.1 and X4.1 are already buffered, and have to be delivered before reading recommences. During time intervals 5 and 6, fragments X3.1 and X4.1 are delivered from buffers, while fragments X3.0 and X4.0 are delivered directly from disk. Starting at time 7, the coalescing has been completed and the two consecutive disks pipeline the fragments directly from the disk to the network.

The choice of a value for the stride, k, must be determined at the time the system is configured. It may vary in value from 1 to D, the number of disks, since a value, i, greater than D is functionally equivalent to i modulo D. The choice of k and D is important as a particular combination of values for k and D can result in very skewed load on the disks, both in terms of storage capacity and bandwidth capacity.

For example, consider the two possible extreme values for k of 1 and D. Assume that the system has 10 disks drives, D=10, and large object X consisting of hundreds of cylinders worth of data. Assuming that the degree of declustering for each subobject of X is 4, $M_x=4$. If k is equal to 1, then the number of unique disks employed is 10, four at a time and $S(C_i)$ is the duration before moving to a new set of four disks. If k is equal to D, then all subobjects of X are assigned to the same disk drive. Hence, the number of unique disks employed to display X is $M_x$, each for the entire display time of X which is size (X) $/B_{display(X)}$. Assume requests for objects X and Y arrive to both systems, namely one system with k=1 and other system with k=D and assume X0.0 and Y0.0 reside in the same disk. Assume that the request for X arrives first and is followed by the request for Y. In this case, with k=1, Y observes the delay equivalent to $S(C_i)$ which is typically less than a second. With k=D, Y observes a delay equivalent to the display time of X which is very much larger which is generally unacceptable. To prevent data skew, the subobject size of every object in the system must be a multiple of the greatest common divisor of D, the total number of disks, and k, the stride. In particular, the stride of 1 guarantees no data skew. Similarly, any choice of D and k such that D and k are relatively prime numbers guarantees no data skew.

Note that with k=D, the display of each object is very efficient because the system can cluster the different subobjects of X on adjacent cylinders in order to minimize the percentage of disk bandwidth that is wasted. As will be shown below, savings of less than 10 percent of the disk bandwidth as compared to high probability of collisions is not beneficial.

When k ranges in value between 1 and D, the size of an object X determines the number of disk drives employed to display X, because the size of each fragment is fixed, which in our case, is a cylinder. For example, assume that D is equal to 100 and an object X is comprised of 100 cylinders, $M_x$ is equal to 4. With k equal to $M_x$ as in simple striping, X is spread across all the D disk drives. However, with a stride of k=1, X is spread across 28 disk drives. In this case, the expected latency with k=1 is higher than with k=$M_x$.

There are low bandwidth objects for which $B_{display}$ is less than $B_{disk}$. Such objects include audio or slow scan video. Similarly, there are objects whose bandwidth requirement is not an exact multiple of the bandwidth of the disk, $B_{disk}$. In these cases, there will be wasted disk bandwidth due to the request to use an integral number of disks. For example, an object requiring 30 mbps when $B_{disk}$ equal 20 would waste 25 percent of the bandwidth of the two disks used per interval. Staggered striping more efficiently supports these low bandwidth objects at a cost of some additional buffer space. To efficiently use disk and disk bandwidth, some objects of two or more low bandwidth objects are read and delivered in a single time interval.

Consider two subobjects $X_i$ and $Y_j$, each of which has a $B_{display}$ equal to ½ $B_{disk}$ and which are to be read during the same time interval. The data and subobject $X_i$ needs to be delivered during the entire time interval including the time when $Y_j$ is being read. An additional buffer can be used to store part of $X_i$ while subobject $Y_j$ is being read. Similarly, part of $Y_j$ needs to be buffered while $X_{i+1}$ is being read during the next time interval. Note that we are again assuming that a node can concurrently transmit from a main memory buffer and from a disk using the pipelining scheme.

Figure 7:
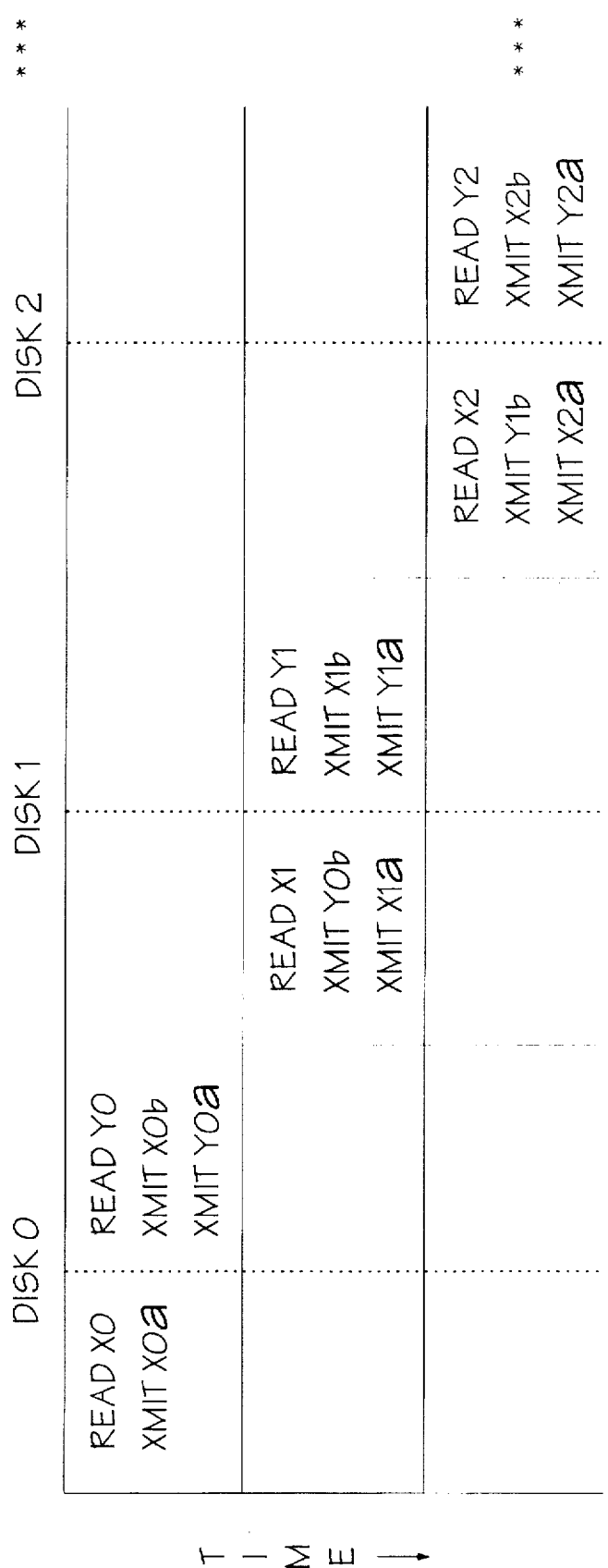
FIG. 7 illustrates the use of disks in a staggered striping system when low bandwidth objects are displayed.

FIG. 7 diagrammatically depicts how this is accomplished. During the first half of the first time interval, subobject $X_0$ is read and the first half of $X_0$, denoted as X0*a*, is transmitted using pipelining. The second half of subobject $X_0$, X0*b*, is buffered for transmission during the second half of the time interval. In the second half of the first time interval, subobject $Y_0$ is read and both Y0*a* and X0*b* from the buffer are transmitted. Y0*b* now needs to be buffered for transmission during the first half of the second time interval. This process continues until both objects are completely transmitted.

This scheme effectively divides each disk into two logical disks so approximately ½ the bandwidth of the original disk. This scheme can also be beneficial in reducing the overhead due to the use of an integral number of disks. In effect, the request is that an integral number of logical disks be allocated to a request. For example, an object that has $B_{display}$ equal to ⅔ $B_{disk}$ can be exactly accommodated with no loss due to rounding up the number of disks. In general, the waste due to rounding is reduced.

Assume that the bandwidth of a tertiary store is lower than the bandwidth required to display an object. A tertiary storage device provides mass storage (terabytes or petabytes) at very low cost. One of its limitations is the high latency incurred when it starts to retrieve an object. Currently a tape library is considered a tertiary storage device. Its cost per megabyte of storage is less than $0.05 per megabyte. However, its latency time may vary from a few seconds to several minutes. Traditionally, the transfer rate of a tape library was low. More recently, tape libraries with high transfer rates have become available, although the latency times of these devices continues to remain significant. When materializing an object X, the tertiary device cannot produce an entire subobject during each time interval to write to a disk cluster. It produces $B_{tertiary}/B_{display}$ (X)× size (subobject). If an object is stored in a sequential manner on the tertiary store, then the bandwidth of both the disk and the tertiary store will be wasted. This is due to the layout mismatch between the organization of data on a tertiary store and that on the disk drives. The organization of an object on the disk drives is not sequential. When materializing object X, this mismatch will cause the system to write $B_{tertiary}/B_{display}$ (X) fraction of subobject $X_0$ to $M_x$ idle disk drives in the first time interval. In the second time interval, the system moves k disks to the right requiring the tertiary device to produce $B_{tertiary}/B_{display}$ (X) fraction of $X_1$. This would require the tertiary store to reposition its disk head. This reposition time is typically very high for tertiary storage devices and may exceed the duration of a time interval. In this case, the system would be required to materialize a different subobject every other time interval with a tertiary storage device spending a major fraction of its time repositioning its head instead of producing data.

One approach to resolve the mismatch between tertiary storage and the disks is to write the data on the tape in the same order as it is expected to be delivered to the disks. For example, assume an object X with a bandwidth of 80 mbps. If the bandwidth of the tertiary storage is 40 mbps, and the bandwidth of each disk drive is 20 mbps, then the fragments of X could be stored in the tertiary storage based on the organization of fragments across the disk drives as follows: X0.0, X0.1, X1.0, X1.1, X2.0, X2.1 . . . . The materialization of object X would employ two disk drives in each time cycle. During the first time cycle, it writes the first two fragments of subobject $X_0$, namely X0.0 and X0.1, while during the second time cycle, it moves k disk to the right to materialize the first two fragments of $X_1$, namely X1.0 and X1.1, without repositioning its head. This process is repeated until X is materialized in its entirety.

A limitation of this technique is that if the bandwidth of a disk relative to the tertiary storage were to change, then all the data in on the tertiary storage would have to be re-recorded.

To this point in the specification, we have described delivery of an object at a constant bandwidth, $B_{display}$. Other features, such as rewind, fast forward, and fast forward with scan may also be desired. Rewinding or fast forwarding to any spot on the data can be accomplished by waiting for the set of disks servicing the request to advance to the appropriate position. Alternatively, if the appropriate number of disks contain the reference location in an object are idle, then the system can employ them to service the request immediately. Even though there is a bandwidth/layout mismatch, the user will not observe hiccups since the system displays no data.

Fast forwarding with scanning is more complicated because there is a bandwidth/layout mismatch and images need to be displayed. This is because the data is laid out for normal speed delivery, but there is an occasional demand for fast delivery of only a fraction of the data. For example, typical fast forward scans of VHS video display approximately every 16th frame. In order to provide this functionality, the staggered striping approach stores a fast forward replica object for each object in the system. This replica is a small fraction of the size of a subobject. When fast forward scan is invoked, the system uses this replica to support the display instead of the normal speed object data. When a request for fast forward replica arrives, disks at or close to the correct point in the fast forward replica can start thereby displaying the replica instead of the normal speed object. If excess bandwidth is not available, the system may incur a transfer initiation delay when switching to the fast forward replica and back to the normal speed replica. This should not be a serious problem because exact synchronous delivery is not expected when switching between normal speed delivery and fast forward scanning.

Figure 8:
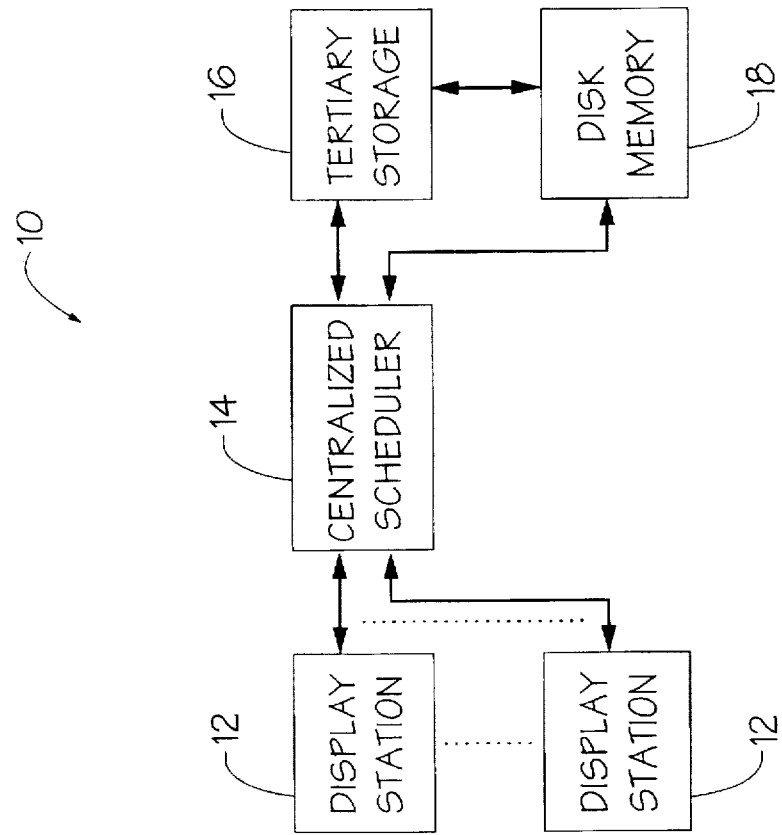
FIG. 8 illustrate a simulated system for optimize the bandwidth fragmented disk.

Consider a simulated system such as shown in block diagram in FIG. 8. Simulated system, generally denoted by reference numeral 10, is comprised of a display station 12 coupled to a centralized scheduler 14 which is bidirectionally coupled to a tertiary storage systems 16 and disk memory system 18. In the simulated unit, there is a single tertiary device 16 and 1,000 disks within disk memory 18. The bandwidth of tertiary storage 16 is 40 mbps. The database has 2,000 objects stored within it, with 3,000 subobjects per object. Display station 12 has a bandwidth of 100 mbps. The 2,000 objects are stored among the 1,000 disks with a degree of declustering equal to 5. The disk parameters, as well as the foregoing simulation parameters, are set forth below in Table 1.

| Disk Parameters | |
|---|---|
| Storage Capacity | 4.54 gigabyte |
| Number of Cylinders | 3000 |
| Storage Capacity of a Cylinder | 1.512 megabyte |
| Average Latency Time | 8.33 msec |
| Maximum Latency Time | 16.83 msec |
| $B_{Disk}$ | 20 mbps |
| Minimum Seek Time | 4 msec |
| Maximum Seek Time | 35 msec |
| Average Seek Time | 15 msec |
| Database Parameters | |
| Number of objects | 2000 |
| Number of Subobjects/object | 3000 |
| $B_{Display}$ | 100 mbps |
| Degree of Declustering (M) | 5 |
| System Parameters | |
| Number of Disks (D) | 1000 |
| Number of Tertiary Devices | 1 |
| Stride (k) | 5 |
| $B_{Tertiary}$ | 40 mbps |

Display station 12 is comprised of a terminal that generates the workload of the system. Each disk within disk memory 18 provides a 20 megabit per second bandwidth and is comprised of 3,000 cylinders, each with a capacity of 1.512 megabytes. The capacity of each disk drive is thus 4.5 gigabytes. Tertiary storage device 16 has a 40 mbps bandwidth. Centralized scheduler 14 implements an object manager, a disk manager and a tertiary manager in software. The object manager maintains the availability of different objects on the disk drives. Once the storage capacity of disk drives is exhausted, and a request references an object that is tertiary resident, it implements a replacement policy that removes the least frequently accessed object with the referenced object. The disk manager module keeps track of the different disks and their status, that is busy or idle, for each time interval. The tertiary manager maintains a queue request waiting to be serviced by the tertiary storage device 16.

Assume for simplicity that the database within system 10 is comprised of a single media type. Assume the bandwidth requirement of this media type is 100 mbps so that M=5. All object are further assumed to be of equal size and to be comprised of 3,000 subobjects. The size of each fragment is also equivalent to the size of a cylinder in each of the disks so that the size of the object is 5 times the size of the cylinder. Hence, the display time of each object is 1,814 seconds (30 minutes and 14 seconds). The size of the database is approximately 10 times available disk storage capacity.

Both striping and virtual data replication was used to construct 200 disk clusters (D/M). Virtual disk replication assigned an object to a single disk cluster. With the chosen parameters discussed above, at most one object can be assigned to a cluster and the storage capacity of a cluster is exhausted by the single object. Frequently accessed objects were detected and replicated in order to avoid the formation of bottlenecks. Striping also allowed 200 objects to become disk resident, however, it stripes each object over all the available clusters.

Assume now that display station 12 requests an object pursuant to user control. Assume further, display station 12 displays only one object at a time. In the simulation between 1 to 256 display stations 12 were simulated. Assume that once a display station issues a request, it does not issue another request until the first one is serviced. Also assume that there is zero think time between requests. These assumptions stress database system 12 and serve as a basis of comparing striping with virtual data replication in a worst case scenario.

The distribution of the objects in the plurality of memories was varied from uniform to skewed in order to analyze performance of the different techniques with various working set sizes. In each case, the object reference probabilities were modeled by truncated geometric distribution. The mean was varied to model different reference patterns from highly skewed to more uniform. Means with three different values were analyzed, resulting in approximately 100, 200 and 400 unique objects being referenced.

Figure 9A:
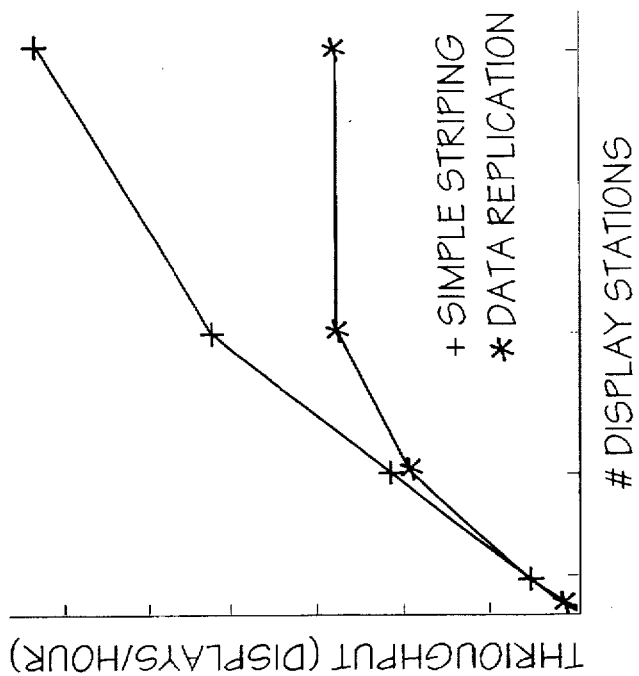
FIGS. 9a–c illustrate the comparative performance of a system using striping and a prior art virtual data replication system.
Figure 9C:
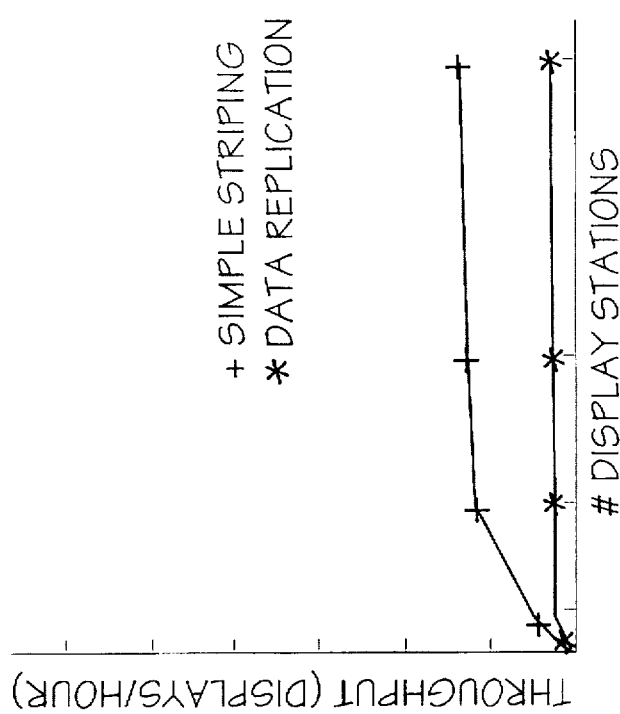
Figure 9B:
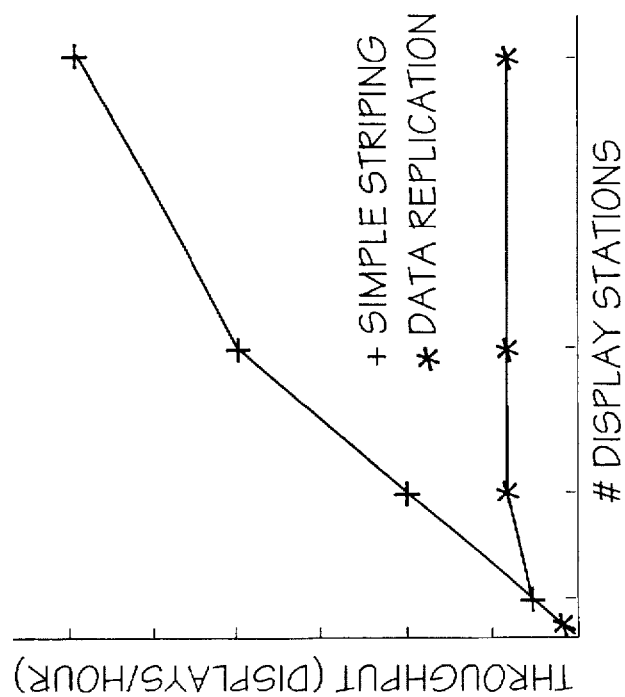

The results of the simulation is shown in FIGS. 9a–9c where virtual data replication and striping for various system loads are compared with different degrees of uniformity or skew of the objects. In general, as the distribution of access to the objects becomes more uniform, the throughput of system 10 with both techniques decreases as shown in FIG. 9c. This is because the probability of a request referencing an object that is not disk resident, and therefore incurring the overhead of materializing the object from the tertiary storage device 16, increases. FIGS. 9a–9b plot the throughput in displays per hour as a function of the number of display stations. For a low number of display stations, both the prior art virtual data replication and striping technique, provide approximately the same throughput. However, as the system load increases, striping outperforms virtual data replication by a wider margin. With a skew distribution of access to the objects as shown in FIG. 9a, striping outperforms virtual data replication because by striping a frequently accessed object is prevented from becoming a bottleneck for the system. When the distribution of access becomes more uniform, striping continues to provide a superior performance because it allows a larger number of unique object to become disk resident. Whereas virtual data replication, by replicating the frequently accessed objects, reduces the number of unique objects that are disk resident.

As the distribution of access becomes more uniform, as shown in FIG. 9b, tertiary storage device 16 starts to become the bottleneck and determines the overall processing capacity of system 10. This reduces the percentage improvement observed with striping.

Staggered striping enables system 10 to guarantee a continuous retrieval of an object at the bandwidth required to support display stations 12. Staggered striping provides effective support for multiple users and a database comprised of a mix of media types where each media has a different bandwidth requirement.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for managing a plurality of objects of multimedia information, each having an original bandwidth which varies from object to object, comprising the steps of:

providing a plurality of memories, having a total number of memories, D and a bandwidth m;

for each object logically dividing said plurality of memories into a subplurality of clusters of said memories, with number of memories per cluster being defined by modulo bandwidth of the object divided by bandwidth m and with a degree of declustering, M, for the object being equal to the number of memories in each cluster;

dividing each object into a plurality of subobjects and storing the subobjects, one subobject per cluster;

dividing each subobject into a plurality of fragments, said fragments being stored in said memories, one fragment per each memory of the subobject's cluster with the fragments disposed so that a first fragment of a subobject is a number, k, of memories, defined as stride, apart from a memory in which a first fragment of the preceding subobject is stored, with stride for all objects being identical; and accessing all memories of one cluster concurrently to retreive the stored subobject, whereby objects of differing bandwidths can be efficiently mixed and continuous random retrieval of each object is realized at a bandwidth equal to the original bandwidth of that object to support display thereof.

2. The method of claim 1 wherein said stride, k, is an arbitrary number chosen modulo the total number of memories, D, comprising said plurality of memories.

3. The method of claim 1 wherein said objects are of a single media type and wherein said number of memories, D, is a multiple of said degree of declustering, M, said stride, k, being equal to said degree of declustering.

4. The method of claim 2 wherein said objects are of a single media type and wherein said number of memories, D, is a multiple of said degree of declustering, M, said stride, k, being equal to said degree of declustering.

5. The method of claim 1 wherein at least two of said objects are different media types having different original bandwidths so that each said object has a different degree of declustering, and where logically dividing and storing subobjects independently assigns each of said subobjects to selected ones of said memories, the assignment of said subobjects of each object to selected ones of said memories being determined by the value of said stride, k.

6. The method of claim 1 further comprising displaying at least one of said objects by reading in parallel said fragments of said subobjects from said memories, a subobject being read during a predetermined time interval, said memories selected in one time interval as compared to a prior time interval being shifted k memories in sequence where k is unequal to said degree of declustering.

7. The method of claim 5 further comprising displaying at least one of said objects by reading in parallel said fragments of said subobjects from said memories, a subobject being read during a predetermined time interval, said memories selected in one time interval as compared to a prior time interval being shifted k memories in sequence where k is unequal to said degree of declustering.

8. The method of claim 7 wherein logically dividing and storing said subobjects in a cluster of said memories comprises creating fragments within each memory of equal size regardless of media type of said object from which said subobjects are comprised.

9. The method of claim 1 wherein logically dividing and storing said subobjects in a cluster of said memories comprises creating fragments within each memory of equal size regardless of media type of said object from which said subobjects are comprised.

10. The method of claim 1 further comprising:

providing additional memory for a buffer space;

reading a fragment from one of said memories into said buffer space in a first time interval; and concurrently transmitting for display said previously buffered fragment and a corresponding memory resident fragment during a subsequent time interval.

11. The method of claim 5 further comprising:

providing additional memory for a buffer space;

reading a fragment from one of said memories into said buffer space in a first time interval; and concurrently transmitting for display said previously buffered fragment and a corresponding memory resident fragment during a subsequent time interval.

12. The method of claim 6 further comprising:

providing additional memory for a buffer space;

reading a fragment from one of said memories into said buffer space in a first time interval; and concurrently transmitting for display said previously buffered fragment and a corresponding memory resident fragment during a subsequent time interval.

13. The method of claim 1 wherein said subobject of every object has a bit size which is a multiple of the greatest common divisor of the total number of memories, D, and said stride, k, so that data skew is prevented.

14. The method of claim 1 wherein said total number of memories, D, and said stride, k, are prime numbers so that no data skew occurs.

15. The method of claim 1 further comprising reading two or more of said objects where said objects have a bandwidth less than said bandwidth m, said subobjects being read during the same time interval.

16. The method of claim 15 where reading said two or more subobjects comprises:

reading a first subobject during a first portion of a first time interval and concurrently transmitting a first piece of said first subobject storing a second piece of said first subobject in a memory buffer for transmission during a second portion of said first time interval;

reading a second subobject during said second portion of said first time interval and concurrently transmitting a first piece of said second subobject and said second piece of said first subobject;

storing said second piece of said second subobject in a memory buffer for transmission during a first portion of a subsequent second time interval; and repeating the steps of reading a first subobject, storing a second piece of said first subobject, reading a second subobject and storing said second piece of said second subobject until said objects are completely transmitted.

17. The method of claim 1 where said objects have a bandwidth less than said bandwidth m and further comprising logically dividing each of said memories into a plurality of logical submemories having reduced bandwidth, where said bandwidth of said objects is equal to an integral number of said logically divided memories of said reduced bandwidth so that expanded bandwidth objects may be exactly accommodated without loss due to rounding up the number of said memories.

18. The method of claim 1 further comprising:

storing an object X from a tertiary storage device into said plurality of memories by organizing fragments of said object in said tertiary storage device based upon distribution of said fragments across said plurality of memories;

storing a predetermined plurality of fragments of said subobject into a corresponding plurality of said memories during a first time interval; and storing a second sequential set of fragments of said objects at a location k memories advanced in sequence in said plurality in memories, so that there is no delay caused by bandwidth mismatch of said tertiary store device compared to bandwidth of the object X.

19. The method of claim 17 where reading said two or more subobjects comprises:

reading a first subobject during a first portion of a first time interval and concurrently transmitting a first piece of said first subobject;

storing a second piece of said first subobject in a memory buffer for transmission during a second portion of said first time interval;

reading a second subobject during said second portion of said first time interval and concurrently transmitting a first piece of said second subobject and said second piece of said first subobject;

storing said second piece of said second subobject in a memory buffer for transmission during a first portion of a subsequent second time interval; and repeating the steps of reading a first subobject, storing a second piece of said first subobject, reading a second subobject and storing said second piece of said second subobject until said objects are completely transmitted.

20. The method of claim 2 further comprising:

storing an object X from a tertiary storage device into said plurality of memories by organizing fragments of said object in said tertiary storage device based upon distribution of said fragments across said plurality of memories;

storing a predetermined plurality of fragments of said subobject into a corresponding plurality of said memories during a first time interval; and storing a second sequential set of fragments of said objects at a location k memories advanced in sequence in said plurality in memories, so that there is no delay caused by bandwidth mismatch of said tertiary store device compared to bandwidth of the object X.

21. The method of claim 1 further comprising fast forwarding through said plurality of memories with scanning of said object comprising reading a fast forward replica object corresponding to said requested object, said fast forward replica object having a bit size which is a small fraction of bit size of a subobject corresponding to said requested object.

22. A system for storing and managing a plurality of objects of multimedia information, each having an original bandwidth which varies from object to object, comprising:

a plurality of memories, each having a bandwidth m;

for each object to be managed, means for logically dividing said plurality of memories into a subplurality of clusters of said memories so that number of memories per cluster is defined by modulo bandwidth of the object divided by bandwidth m;

means for dividing each object into a plurality of subobjects and for storing the subobjects, one subobject per cluster;

means for dividing each subobject into a plurality of fragments, and for storing said fragments in said memories, one fragment per each memory of the subobject's cluster, disposed so that a first fragment of a subobject is a number of memories, defined as stride, apart from a memory in which a first fragment of the preceding subobject is stored, with stride for all objects being identical; and means for concurrently reading out the memories of one cluster to retrieve the stored subobject, whereby objects of differing bandwidths can be efficiently mixed and continuous random retrieval of each object is realized at a bandwidth equal to the original bandwidth of that object to support display thereof.

* * * * *

UNITED STATES PATENT AND TRADEMARK OFFICE
CERTIFICATE OF CORRECTION

PATENT NO. : 5,799,174
DATED : August 25, 1998
INVENTOR(S) : Muntz, et al.

It is certified that error appears in the above-identified patent and that said Letters Patent is hereby corrected as shown below:

The following statement should appear in col. 1, line 3,
"This invention was made with Government support under grant nos. IRI-9203389 and IRI-9258362 awarded by the National Science Foundation. The Government has certain rights in this invention."

Signed and Sealed this

Tenth Day of August, 1999

Attest:

Q. TODD DICKINSON

*Attesting Officer*　　　*Acting Commissioner of Patents and Trademarks*